(12) United States Patent
Kanda

(10) Patent No.: US 7,756,469 B2
(45) Date of Patent: Jul. 13, 2010

(54) EXTENDED RADIO BASE STATION SYSTEM HAVING BROADCAST WAVE RETRANSMITTING FUNCTION

(75) Inventor: Takashi Kanda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 567 days.

(21) Appl. No.: 11/882,231

(22) Filed: Jul. 31, 2007

(65) Prior Publication Data

US 2008/0081553 A1 Apr. 3, 2008

(30) Foreign Application Priority Data

Sep. 29, 2006 (JP) ............................. 2006-269363

(51) Int. Cl.
*H04B 3/36* (2006.01)
(52) U.S. Cl. ....................... 455/7; 455/556.1
(58) Field of Classification Search ................ 455/7, 455/13.1, 16, 3.06, 524, 520, 553.1, 556.1
See application file for complete search history.

(56) References Cited

U.S. PATENT DOCUMENTS 6,292,673 B1 * 9/2001 Maeda et al. ............... 455/522

FOREIGN PATENT DOCUMENTS

| JP | 2000-261362 | 9/2000 |
| JP | 2000-341162 | 12/2000 |
| JP | 2005-217982 | 8/2005 |
| KR | 20060072791 | 6/2006 |

OTHER PUBLICATIONS

Korean Office Action issued in 10-2007-85016 dated Apr. 27, 2009.
"ISDB-T Gap Filler System", NHK Science & Technical Research Laboratories, Technical Exhibits 24-2; http://www.nhk.or.jp/strl/open2004/tenji/t24-2.html.

* cited by examiner

*Primary Examiner*—Tu X Nguyen
(74) *Attorney, Agent, or Firm*—Hanify & King, PC

(57) ABSTRACT

A broadcast wave retransmission system is provided at a low cost, in an extended radio base station system having a master base station for mobile communications and an extended radio base station that is connected to the master base station via a communication line and that has a radio transmitting/receiving function for the mobile communications, by receiving a broadcast wave, superposing a broadcast signal obtained from the received broadcast wave onto a mobile communication signal sent from the master base station to the extended radio base station, transmitting the resultant signal to the extended radio base station, and separating the broadcast signal from the superposed and transmitted signal and retransmitting the resultant signal as a broadcast wave in the extended radio base station.

15 Claims, 14 Drawing Sheets

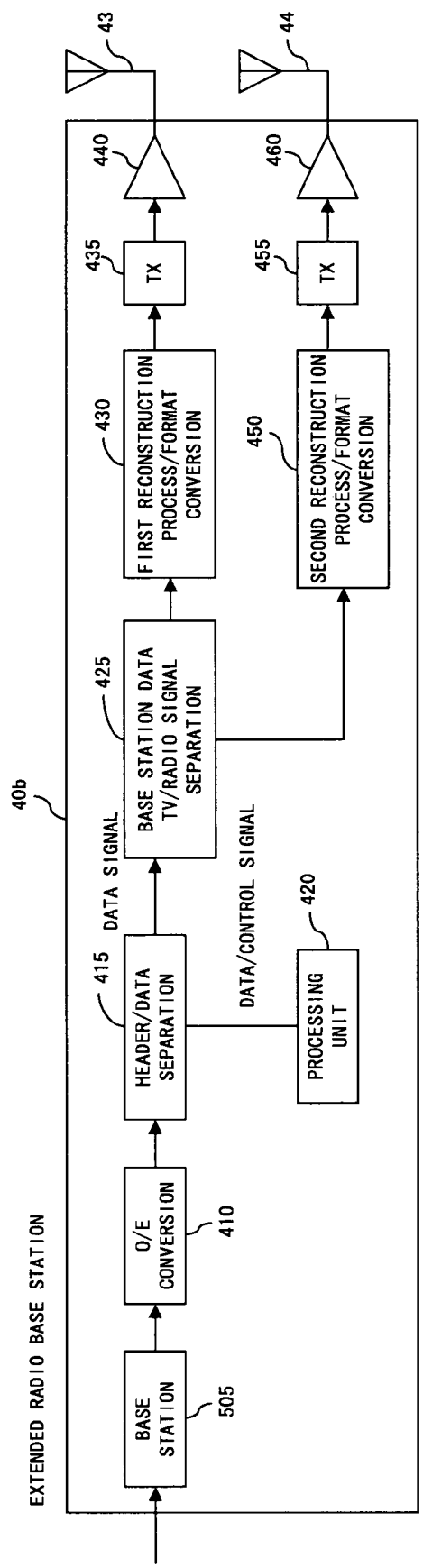
F I G. 1 2

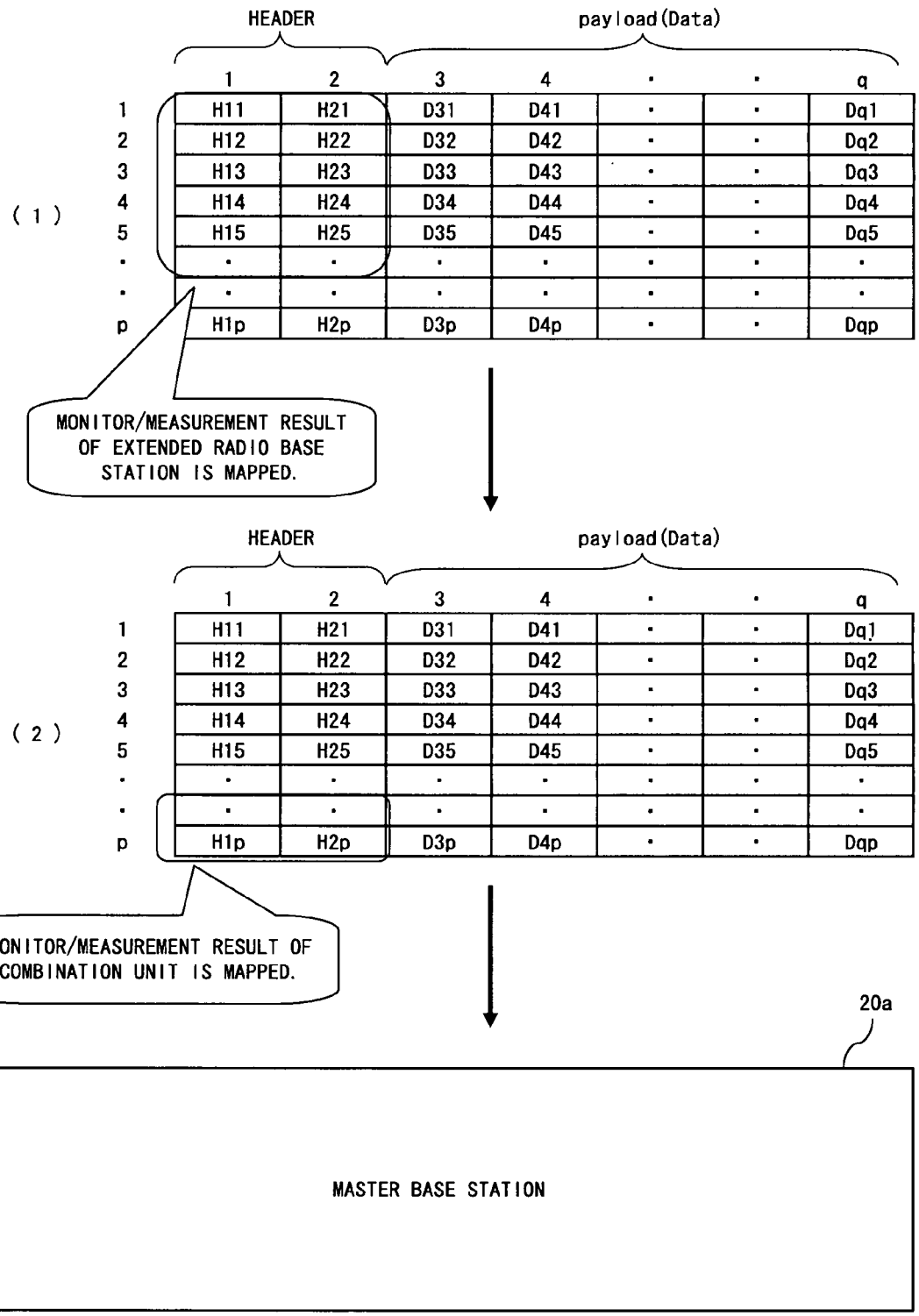
F I G. 14

EXTENDED RADIO BASE STATION SYSTEM HAVING BROADCAST WAVE RETRANSMITTING FUNCTION

BACKGROUND OF THE INVENTION

1. Field of the Invention

The present invention relates to the retransmission of a broadcast wave, and more specifically to a retransmission system for a broadcast wave using an extended radio base station system in mobile communications.

2. Description of the Related Art

Broadcast wave retransmission systems, which are a well-known technology, are provided in places such as behind high-rise buildings, in underground malls, etc., where broadcast waves cannot directly reach. They temporarily receive broadcast waves output from a broadcast station and retransmit the broadcast waves. For example, non-patent document 1 described below discloses a technique of retransmitting a terrestrial digital broadcast.

In mobile communication systems, as described in patent document 1 listed below, an extended radio base station system has been proposed. The extended radio base station system can extend a transmission/reception area with antennas and high-frequency device portions such as radio transmission/reception units and the like by separating from base stations for use in areas such as behind high-rise buildings, in underground malls, etc. where broadcast waves cannot directly reach from outside; this separation of these two portions is performed so that radio waves can be transmitted to a mobile terminal in areas where radio waves cannot reach.

FIG. 1 is a schematic chart of a conventional extended radio base station system that has been extended by separating its high frequency device and antenna portion from the body of its base station, which performs baseband processing and the like, as disclosed by patent document 1.

As shown in FIG. 1, an extended radio base station system 1 is configured by a master base station 2, an extended radio base station 4, and a communication line 9 for connection of the master base station 2 to the extended radio base station 4. Although only one extended radio base station 4 is shown in FIG. 1, there can be a plurality of extended radio base stations 4 for the master base station 2. In the following description, equipment for a master base station and equipment for an extended radio base station can be referred to respectively as the master base station 2 and the extended radio base station 4 so far as misunderstanding can be avoided.

The master base station 2 is configured by the following: a radio transmission/reception device 21, connected to an antenna for mobile communications not shown in FIG. 1, for conversion between high frequency radio signals and baseband signals; a baseband signal processing device 22 for performing signal processing such as spreading a signal at a baseband level; a communication network transmission interface 23 for matching an interface with a mobile communication network 5; a transmission interface 24 for matching an interface with the communication line 9 to and from the extended radio base station 4; and a control unit 25 for control of each of the devices above. In case of no communications are performed from the master base station 2 directly to a mobile terminal, the radio transmission/reception device 21 is not required.

The extended radio base station 4 is configured by a radio transmission/reception device 41 connected to an antenna for mobile communications and a transmission interface 42 for matching an interface with the communication line 9.

As described above, in an area such as a tunnel, the underground portion of a building, etc. where radio waves are cut off by an artificial structure, a mobile telephone cannot be normally used. Also, radio and television sets (mobile units) cannot receive broadcast signals. Although there is presently a system for retransmitting radio waves to parts of the enclosed areas in each system, large-scale construction is required for some retransmission systems, and a heavy load can be imposed in performing it independently. However, there is no superposed system for broadcasting and mobile telephones.

As an example, patent document 2 following describes providing an outdoor antenna of a mobile telephone and a TV receiver for the enhanced indoor communication sensitivity of the mobile telephone and providing an indoor repeater having the function of relaying the mobile telephone signals, but does not describe retransmitting a broadcast wave.

Patent document 3 following describes the sharing of PHS and UHF facilities or the enhancing the sensitivity of an indoor PHS communication wave using house antenna equipment for receiving UHF television broadcast waves, but relates to UHF broadcast waves in a specific band and PHS waves for mobile communications in a specific band, and does not describe retransmitting broadcast waves.

What is described in patent documents 2 and 3 is a device for sharing a household unit, and is not a combination of a plurality of superposed systems as infrastructural social facilities.

[Patent Document 1] Japanese Published Patent Application No. 2005-217982

[Patent Document 2] Japanese Published Patent Application No. 2000-261362

[Patent Document 3] Japanese Published Patent Application No. 2000-341162

[Non-patent Document 1] Giken Koukai in 2004 "Published Exhibition" Technical Exhibition 24-2 "Terrestrial Digital Broadcast" retransmission technique (http://www.n-hk.or.jp/str1/open2004/tenji/t24-2.html)

SUMMARY OF THE INVENTION

The problem to be solved by the present invention is to provide the superposed retransmission system for a mobile communication system and a broadcast system, which can be configured as an infrastructural social facility at a low cost.

To solve the above-mentioned problem, the present invention provides an extended radio base station system having a master base station for mobile communications and an extended radio base station that is connected to the master base station via a communication line and has a radio transmitting/receiving function for mobile communications, and having a device for receiving broadcast waves, a device for superposing a broadcast signal obtained from the received broadcast wave on a mobile communication signal from the master base station to the extended radio base station, a device for transmitting the superposed signals to the extended radio base station, and of which extended radio base station is equipped with a device for separating the broadcast signal from the superposed and transmitted signal and retransmitting the signal as a broadcast wave.

According to one aspect of the present invention, the extended radio base station system includes a combination unit that is connected to the master base station via a first communication line and to the extended radio base station via a second communication line, and receives broadcast wave and superposes a broadcast signal obtained from the received broadcast wave on a mobile communication signal.

According to another aspect of the present invention, a master base station receives a broadcast wave and superposes a broadcast signal obtained from the received broadcast wave onto a mobile communication signal.

According to a further aspect of the present invention, the status of a device for retransmitting a broadcast wave is monitored using the header area of an uplink data signal for mobile communications.

According to the present invention, a combination including a mobile communication system and a broadcast retransmission system does not require respective devices to be provided, thereby decreasing their mounting area and reducing the load of the construction.

Furthermore, using an existing base-station line coaxial cable, an optical cable, etc., it is not necessary to provide a new cable.

Additionally, using the monitoring function of a base station, a broadcast retransmission function can be monitored.

BRIEF DESCRIPTION OF THE DRAWINGS

FIG. 12 is an explanatory view of an example of the block diagram showing the functioning of an extended radio base station according to embodiment 2;

FIG. 14 is a chart to explain the monitoring data mapping according to embodiment 3.

DESCRIPTION OF THE PREFERRED EMBODIMENT

Figure 2:
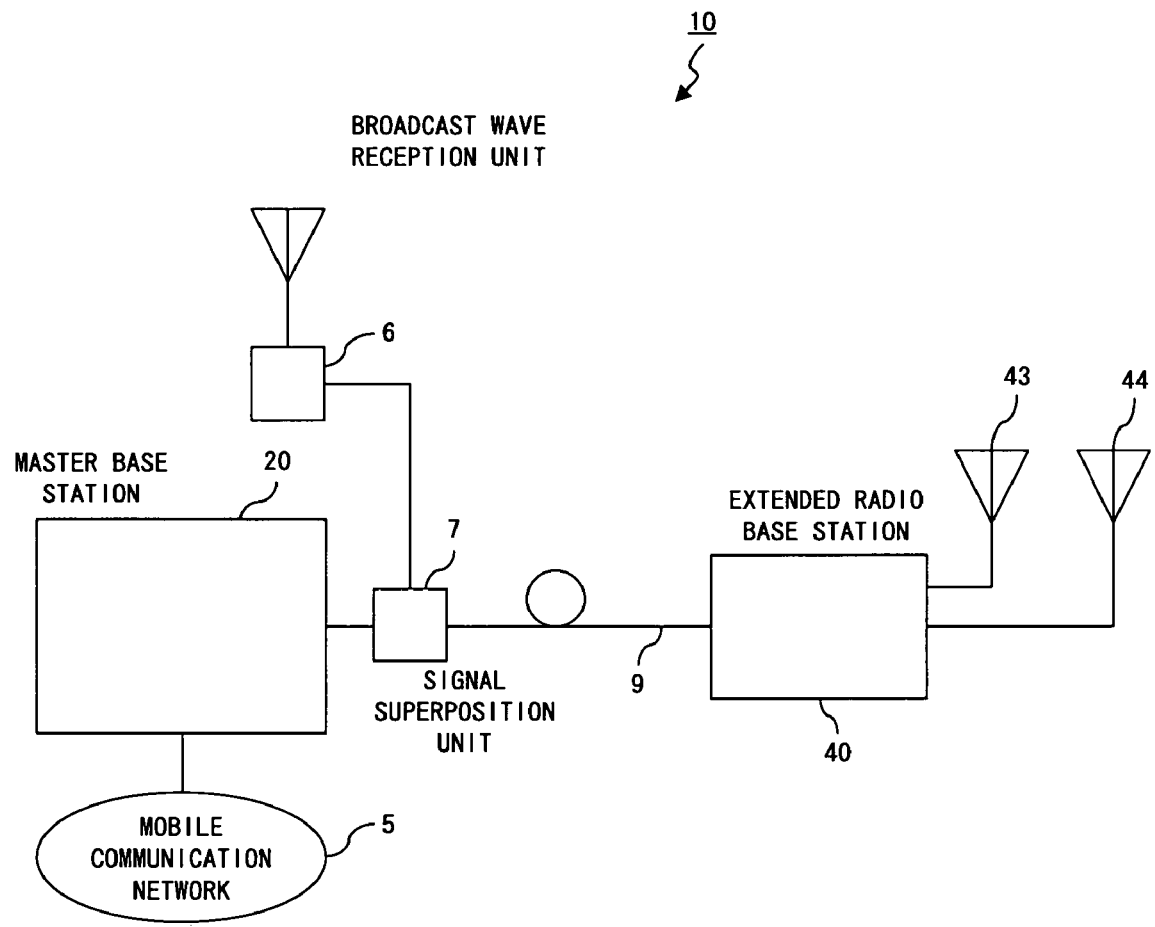
FIG. 2 is an explanatory view showing a basic configuration of the present invention.

FIG. 2 is an explanatory view showing a basic configuration of the present invention.

An extended radio base station system 10 according to the present invention includes a master base station 20 connected to the mobile communication network 5, an extended radio base station 40, the communication line 9 for connecting the master base station 20 and the extended radio base station 40, a broadcast wave reception unit 6 for receiving a broadcast wave, and a signal superposition unit 7 for superposing a broadcast signal obtained from the broadcast wave received by the broadcast wave reception unit 6 onto a mobile communication signal from the master base station 20 to the extended radio base station 40 and for transmitting the superposed mobile communication signal and the broadcast signal to the extended radio base station 40 through the communication line 9.

The extended radio base station 40 separates the broadcast signal from the superposed and transmitted signal, and retransmits it as a broadcast wave from a broadcast antenna 44. A radio wave modulated using the mobile communication signal is radiated from a mobile communication antenna 43.

In FIG. 2, the broadcast wave reception unit 6 and the signal superposition unit 7 are described as being provided outside the master base station, but can be provided at any place where the broadcast signal can be superposed on the mobile communication signal transmitted to the extended radio base station.

With the basic configuration of the present invention described above, the communication line can be shared in the retransmission between the mobile communication system and the broadcast system in an area in which radio waves are cut off, thereby successfully realizing cost reduction.

Although FIG. 2 shows only one extended radio base station 40, a plurality of stations can be provided. This holds true also for the embodiments described below.

Explained next are two embodiments having different location points for the broadcast wave reception unit 6 and the signal superposition unit 7 in the above-mentioned basic configuration.

In one embodiment, a combination unit corresponding to the broadcast wave reception unit 6 and the signal superposition unit 7 in the basic configuration is provided outside the master base station. In another embodiment, two signals are superposed on the master base station side.

Embodiment 1

Figure 1:
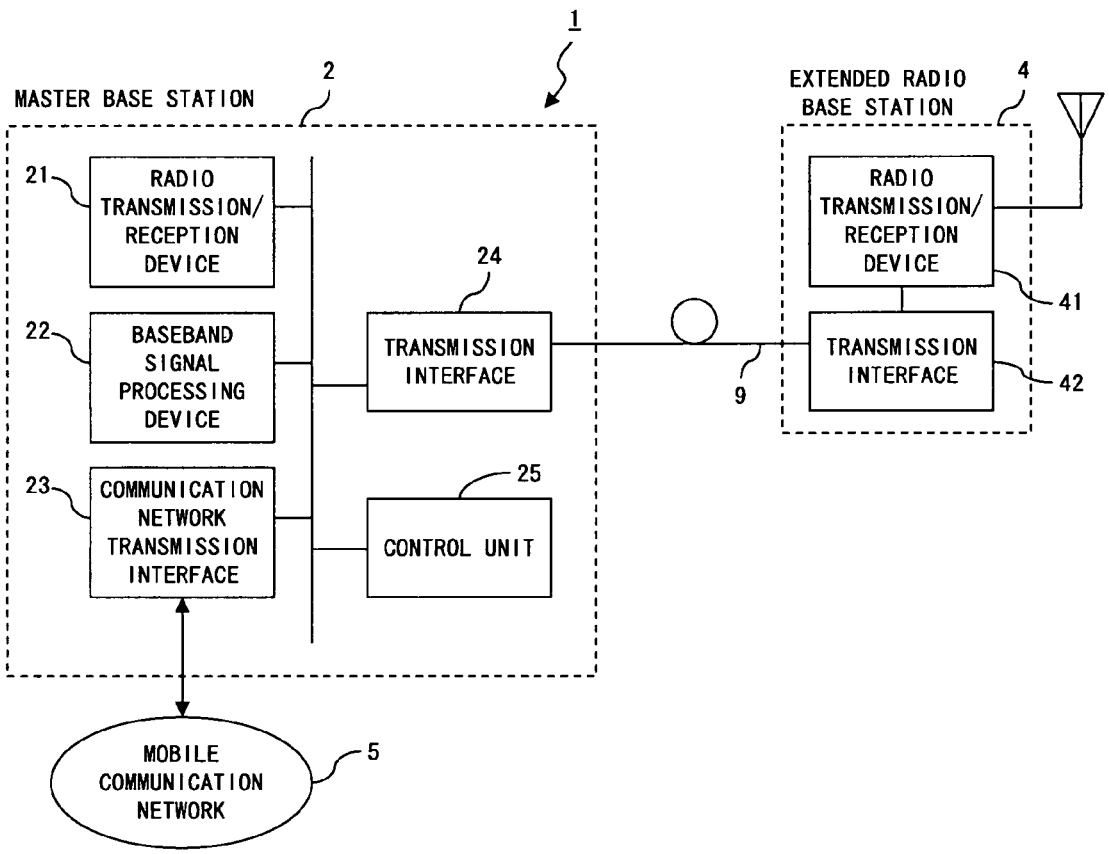
FIG. 1 is a schematic chart showing a conventional extended radio base station system.
Figure 3:
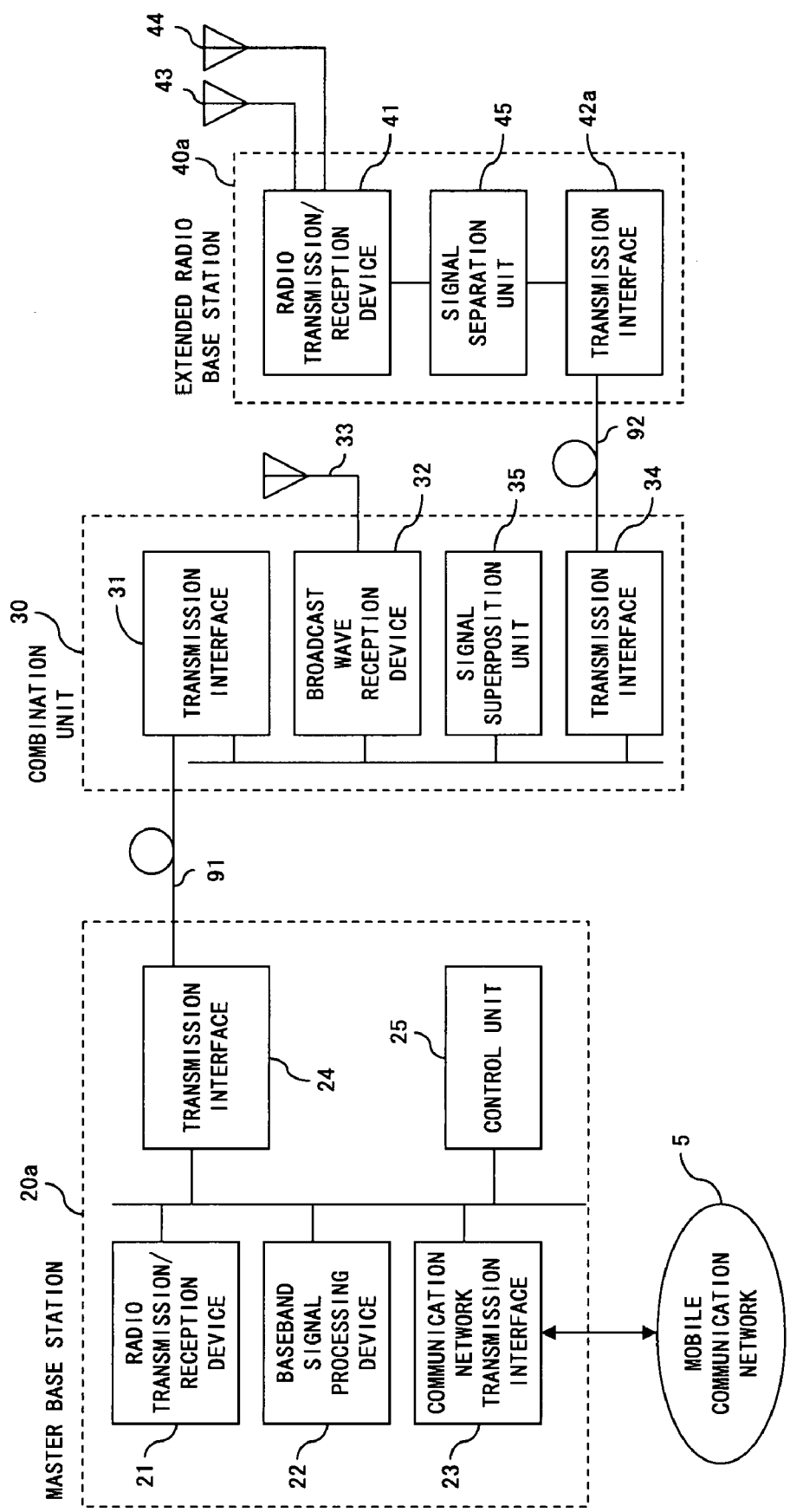
FIG. 3 is an explanatory view of an example of the block diagram showing the functioning according to embodiment 1.

FIG. 3 is an explanatory view of an example of the block diagram showing the functioning according to embodiment 1. A master base station 20a, shown in FIG. 3, is similar to the master base station 2 shown in FIG. 1, and is connected to an antenna for mobile communications (not shown in the attached drawings). The master base station 20a includes the radio transmission/reception device 21 for conversion between a high-frequency radio signal and a baseband signal, the baseband signal processing device 22 for performing signal processing such as spreading at a baseband level and the like, the communication network transmission interface 23 for interface matching with the mobile communication network 5, the transmission interface 24 for interface matching with a communication line 91 to and from a combination unit 30, and the control unit 25 for controlling each of the above-mentioned devices. As with the master base station 2 shown in FIG. 1, it is not indispensable to provide the radio transmission/reception device 21.

In other words, embodiment 1 according to the present invention can be realized without changing the configuration of the existing master base station 2; it can be realized by mounting the combination unit 30. In particular, when the existing master base station 2 is provided in a place not appropriate for receiving a broadcast wave, the broadcast wave can be appropriately retransmitted by providing a combination unit in an appropriate place for reception of the broadcast wave.

The combination unit 30 is configured by a transmission interface 31 for the master base station 20a, a transmission interface 34 for interface matching with a communication line 92 to and from an extended radio base station 40a, a broadcast wave reception device 32, a broadcast wave reception antenna 33, and a signal superposition unit 35. The broadcast wave reception device 32 and the broadcast wave reception antenna 33 correspond to the broadcast wave reception unit 6 in the basic configuration 3 shown in FIG. 2.

The extended radio base station 40a is configured by a radio transmission/reception device 41a, a transmission interface 42a to and from the combination unit 30, the mobile communication antenna 43, the broadcast antenna 44, and a signal separation unit 45.

With the above-mentioned configuration, the master base station 20a has an interface capable of transmitting or receiving a signal modulated at a baseband or a radio-modulated signal.

In the combination unit 30, the signal superposition unit 35 superposes the signal transmitted from the master base station 20a on the signal received by the broadcast wave reception device 32 and the broadcast wave reception antenna 33. When the band of the communication line 92 from the combination unit 30 to the extended radio base station 40a is narrow, the amount of data that can be transmitted is reduced. The combination unit 30 transmits the superposed signal to the extended radio base station 40a.

In the extended radio base station 40, the signal separation unit 45 separates each broadcast signal from its mobile communication signal, and transmits the resultant signals through the mobile communication antenna 43 and the broadcast antenna 44 respectively.

Thus, the broadcast wave received by the combination unit 30 is transmitted to the extended radio base station 40a using the communication line 92 shared in the mobile communication, and is retransmitted from the broadcast antenna 44 of the extended radio base station 40a.

Figure 4:
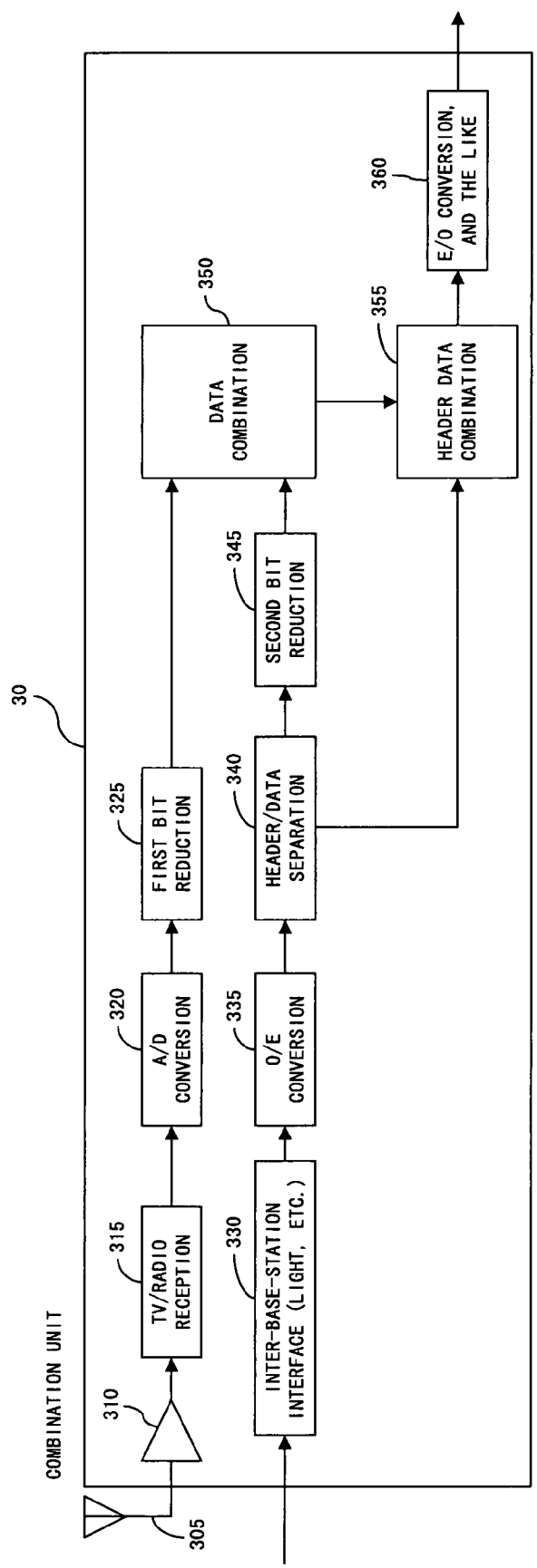
FIG. 4 is an explanatory view of an example of the block diagram showing the functioning of the combination unit according to embodiment 1.

FIG. 4 is an explanatory view of an example of the detailed block diagram showing the functioning of the combination unit 30.

The broadcast signal received by a broadcast antenna 305 is amplified by a reception amplifier 310, demodulated by a TV/radio reception unit 315, and converted into digital signal data by an A/D conversion unit 320. Then, a first bit reduction unit 325 deletes some of the bits as necessary, and the result is input into a data combination unit 350.

A mobile communication signal is input into a header/data separation unit 340 through an inter-base-station interface 330 and an O/E conversion unit 335 for conversion from an optical signal to an electrical signal. The header/data separation unit 340 separates a header from a payload (data), outputs the header to a header data combination unit 355, and outputs the payload to a second bit reduction unit 345 for reducing bits as necessary. The output of the second bit reduction unit 345 is input into the data combination unit 350.

The data combination unit 350 combines the broadcast signal data with the payload of the mobile communication. The combined data is input into the header data combination unit 355, is combined with the header output from the header/data separation unit 340, and is transmitted to the extended radio base station 40a through an E/O conversion unit 360 for conversion from an electrical signal to an optical signal or the like.

The A/D conversion unit 320, the first bit reduction unit 325, the header/data separation unit 340, the second bit reduction unit 345, the data combination unit 350, and the header data combination unit 355 shown in FIG. 4 correspond to the signal superposition unit 35 shown in FIG. 3.

Next, an example of a signal superposing operation in the combination unit 30 is explained below by referring to FIG. 5.

Figure 5:
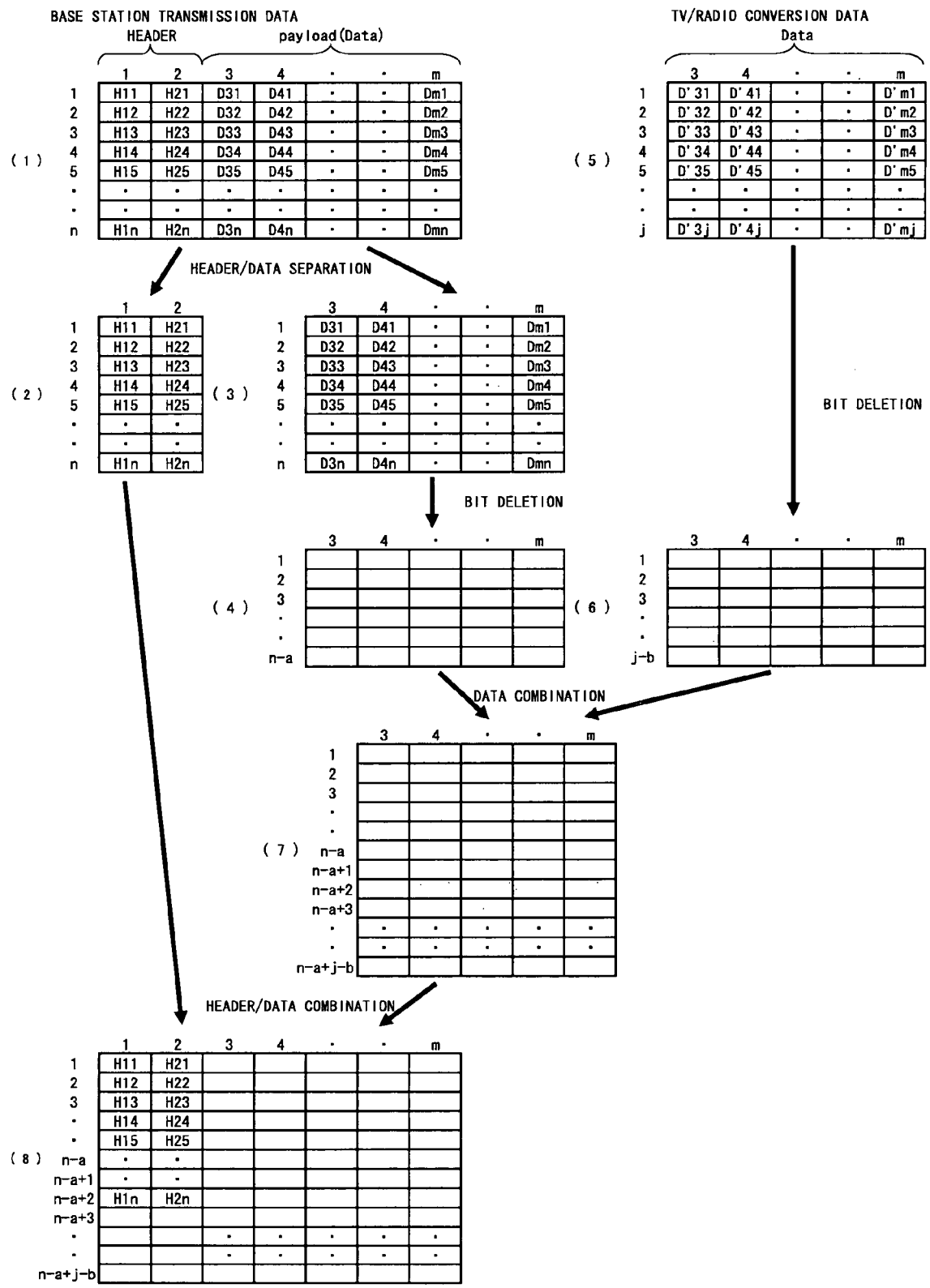
FIG. 5 is an explanatory view showing a signal superposing operation according to embodiment 1.

(1) in FIG. 5 shows the data mapped on the table of n rows by m columns after being simultaneously transmitted continuously on the communication line 91 from the master base station 20a. On the communication line 91, an m-word unit is transmitted n times repeatedly.

One row includes a 2-word header portion and an (m−2) word payload portion, but the bit length of one word, the word length of a header and a payload, and the number n of rows can be appropriately determined by the band of the communication line being used. The header portion can also be provided with an area to which the control information can be transmitted not only for mobile communications but also for the retransmission of a broadcast wave.

The data transmitted in the format shown by (1) in FIG. 5 is separated by the header/data separation unit 340 into the header and the payload, as shown by (2) and (3) in FIG. 5, as described above.

The payload bits are reduced, for example, by a rows as shown at (4) in FIG. 5 by the second bit reduction unit 345 when the band of the communication line 92 is narrow.

The broadcast signal is converted into digital data by the A/D conversion unit 320, and the bit stream is mapped onto the table of j rows by (m−2) columns, as shown by (5) in FIG. 5. How the data of each broadcast channel is mapped can be determined by considering the number of broadcast channels along which the retransmission is performed, the band required by the channels, the ease of processing, etc. However, the data can be allocated to a broadcast channel on the basis of the word position in a column unit—for example, (m−2) words.

From the data shown by (5) in FIG. 5, if the bits in, for example, b rows are deleted by the first bit reduction unit 325, the data shown by (6) in FIG. 5 is obtained.

The data shown by (4) in FIG. 5 and the data shown by (6) in FIG. 5 are combined by the data combination unit 350, and the data shown by (7) in FIG. 5 is obtained. Then, the header data combination unit 355 combines the temporarily separated header shown by (2) in FIG. 5 with the data shown by (7) in FIG. 5, and transmits the combined data shown by (8) in FIG. 5 to the extended radio base station 40a.

The number of bits deleted by the first and second bit reduction units is determined by the band of the communication line 92 from the combination unit 30 to the extended radio base station 40a. However, if there is a sufficiently broad band, no deletion is required. Generally, the fixed value that the number of bits should be reduced is set as a parameter, but can also be dynamically set by monitoring the type of service (voice or packet) and the amount of traffic.

As explained above by referring to FIG. 5, a broadcast wave can be retransmitted in an extended radio base station system by digitizing a mobile communication signal and a broadcast signal and transmitting them in a predetermined format regardless of the system of mobile communications and the type of broadcast (such as TV, radio, etc.)

In addition, the process of superposing the two signals as signals to be transmitted simultaneously and continuously can be easily performed by equalizing row lengths between the payload portion of the data format of the mobile communication and the payload portion of the data format of the broadcast signal.

Figure 6:
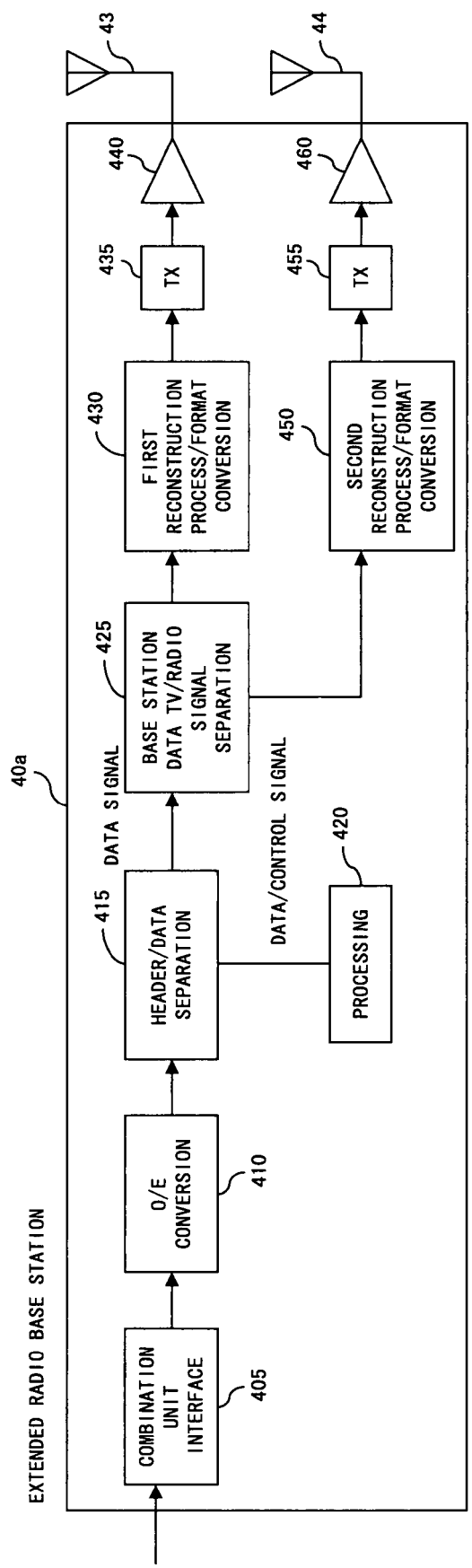
FIG. 6 is an explanatory view of an example of the block diagram showing the functioning of an extended radio base station according to embodiment 1.

FIG. 6 is an explanatory view of an example of the detailed block diagram showing the functioning of an extended radio base station 40a.

The function of receiving data is devised for mobile communications, but it is omitted from FIG. 6.

A superposed broadcast signal and mobile communication signal transmitted from the combination unit 30 is input into a header/data separation unit 415 through a combination unit interface 405 and an O/E conversion unit 410, and the data shown by (8) in FIG. 5 is separated into the header shown by (2) and the combined data shown by (7).

The header is provided for a processing unit 420.

The combined data is separated into the data shown by (4) and (5) in FIG. 5 by a base station data TV/radio signal separation unit 425, and each separated data is reconstructed into an original signal format by a first reconstruction process/format conversion unit 430 or a second reconstruction process/format conversion unit 450, and each reconstructed signals are transmitted through a mobile communication transmission unit 435, a mobile communication amplifier 440, and a mobile communication antenna 43, or through a TV/radio transmission unit 455, a TV/radio transmission amplifier 460, and the broadcast antenna 44.

Figure 7:
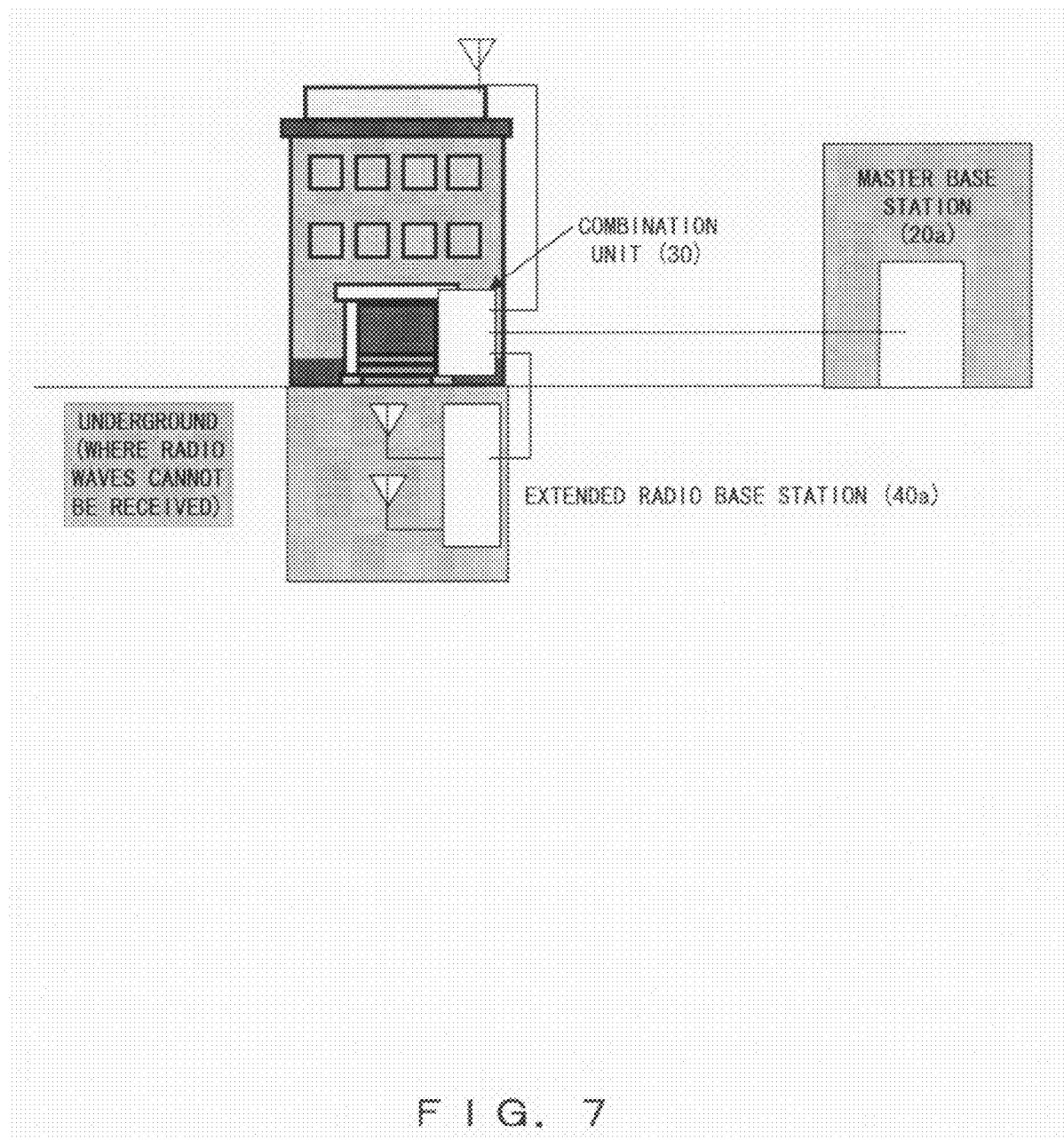
FIG. 7 is an explanatory view showing the mode of mounting an extended radio base station system according to embodiment 1.

FIG. 7 is an explanatory view showing the mode of mounting an extended radio base station system according to embodiment 1. In the example shown in FIG. 7, the extended radio base station 40a is mounted in a different building from a building accommodating the master base station 20a, and has an antenna extended to the underground area where radio waves cannot reach. The combination unit 30 is mounted in the building where the extended radio base station 40a is mounted.

According to embodiment 1, although broadcast waves cannot be sufficiently received in the building where the master base station 20a is mounted, a mobile communication signal can be superposed by a broadcast signal; the broadcast waves are received by mounting the combination unit 30 in a building in which the extended radio base station 40a is mounted and the broadcast waves can be received. If the broadcast wave cannot be sufficiently received in the building where the extended radio base station 40a is mounted either, then the present invention can be applied to an existing extended radio base station system by mounting the combination unit 30 at a point at which broadcast waves can be appropriately received on a route of the communication line connecting the master base station 20a and the extended radio base station 40a.

Figure 8:
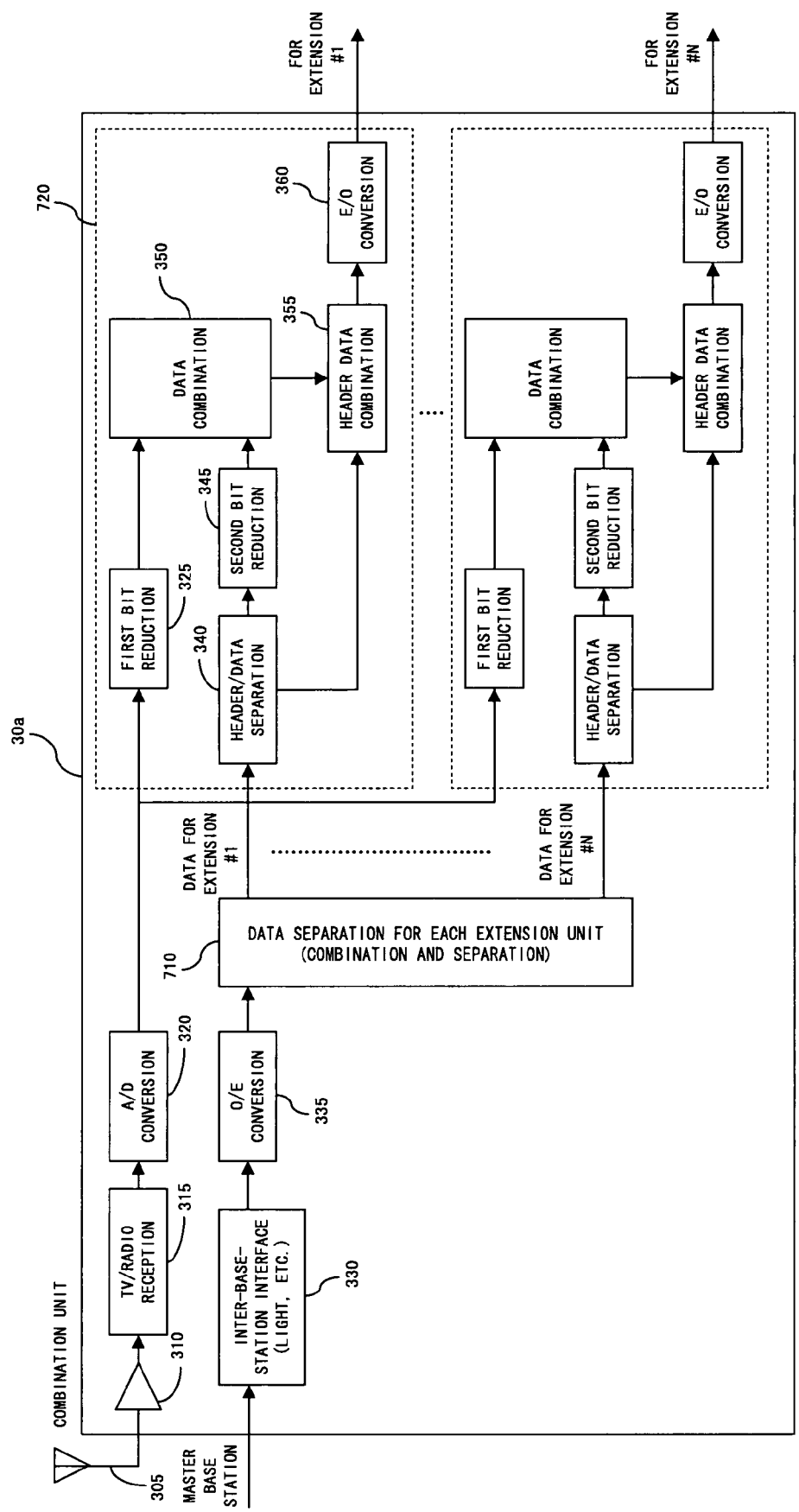
FIG. 8 is an explanatory view of an example of the block diagram showing the functioning of a combination unit in an example of a variation according to embodiment 1.
Figure 9:
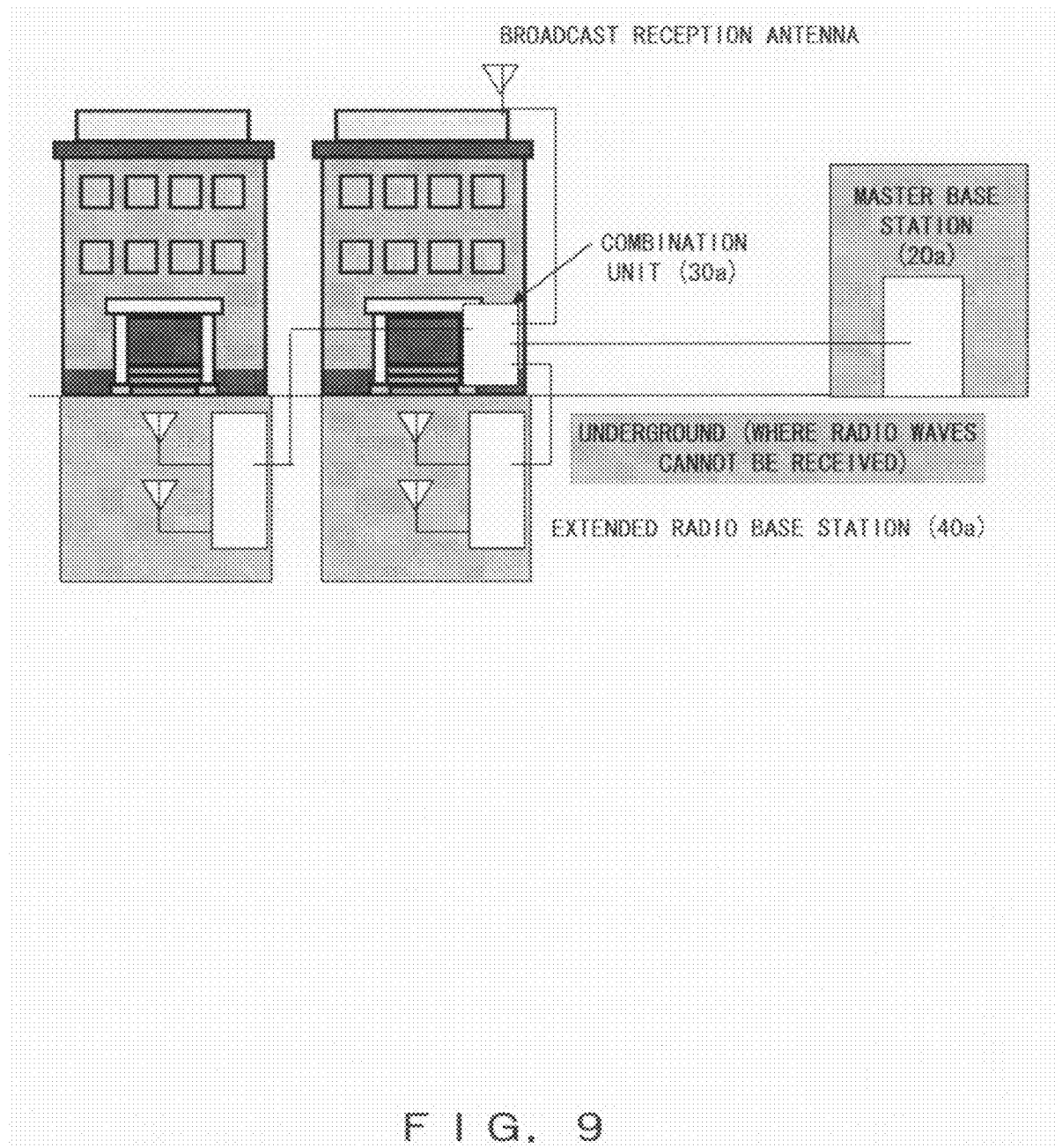
FIG. 9 is an explanatory view showing the mode of mounting an extended radio base station system in an example of a variation according to embodiment 1.

FIGS. 8 and 9 show examples of variations of embodiment 1. In the example, a plurality of extended radio base stations 40a are connected to one combination unit 30a. In the configuration of the examples of the variations, as illustrated in FIG. 9, two extended radio base stations 40a are provided for underground malls and similar locations in the vicinity of the underground mall or similar location, and can be applied when the extended radio base stations 40a and the master base station 20a are connected via the communication line 91 shared among the plurality of extended radio base stations 40a. The configuration can also be applied when a new extended radio base station 40a is provided for an underground mall or similar location in the vicinity of the underground mall or similar location when the operation shown in FIG. 7 is performed.

The combination unit 30a in the example of the variation described above is the same as the combination unit 30 shown in FIG. 4 except that a data separation unit 710 for combining and separating the communication data for each extended radio base station 40a as shown in FIG. 8 and a plurality of extended radio base station correspondence units 720 for superposing signals corresponding to each extended radio base station 40a and performing transmission interface matching are provided.

Embodiment 2

Embodiment 2 is described below.

Figure 10:
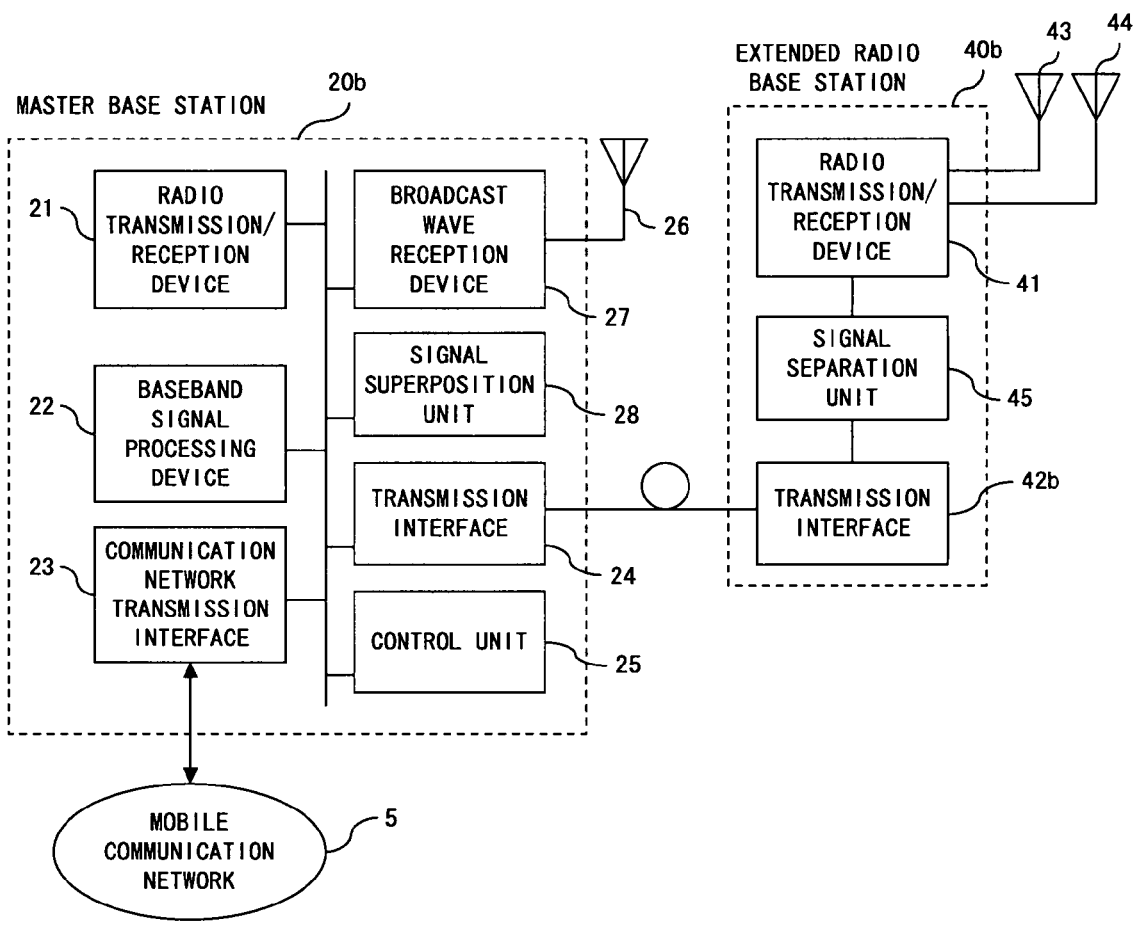
FIG. 10 is an explanatory view of a block diagram showing the functioning according to embodiment 2.

FIG. 10 is an explanatory view of a block diagram showing the functioning according to embodiment 2. A master base station 20b is obtained by adding to the master base station 20a, a broadcast antenna 26, a broadcast wave reception device 27, and a signal superposition unit 28 corresponding to the broadcast wave reception unit 6 and the signal superposition unit 7 shown in FIG. 2. Extended radio base station 40b is the same as extended radio base station 40a shown in FIG. 3 except that a transmission interface 42b corresponds to the master base station 20b.

Figure 11:
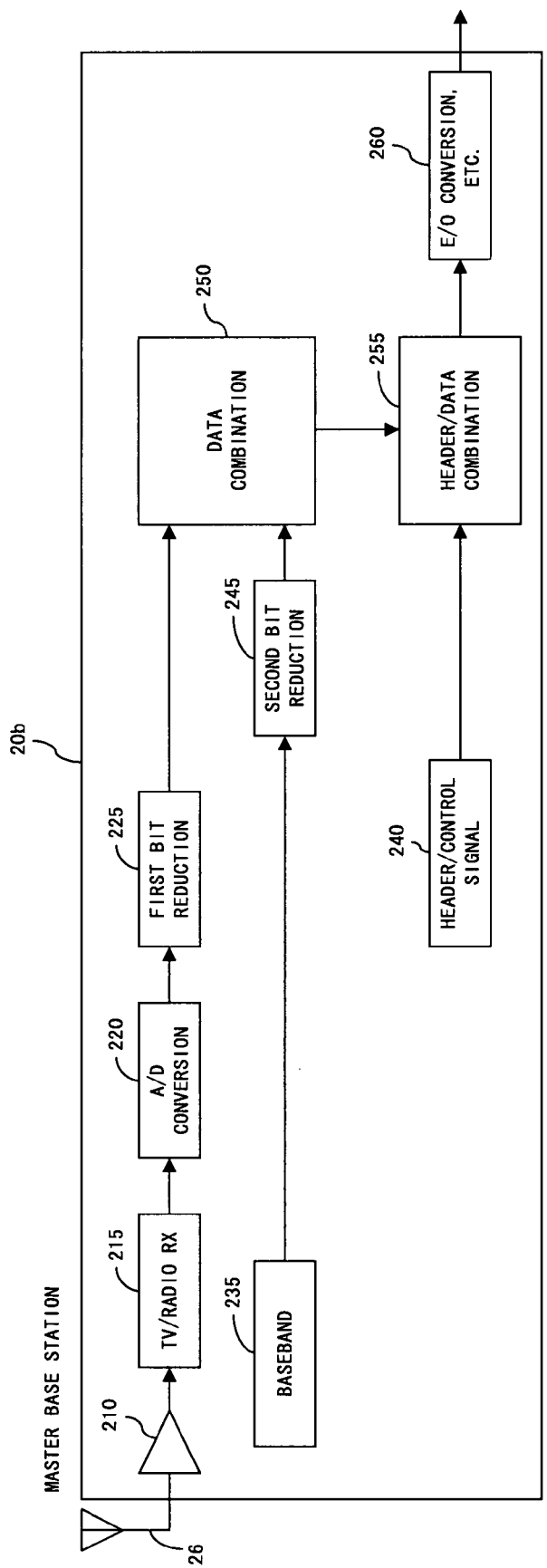
FIG. 11 is an explanatory view of an example of the block diagram showing the functioning of receiving a broadcast wave and superposing a signal in the master base station according to embodiment 2.

FIG. 11 is an explanatory view of an example of the block diagram showing the functioning of receiving a broadcast wave and superposing a signal in the master base station 20a. The portion for outputting a payload and the portion for generating and outputting a header are respectively described as a single block.

The broadcast signal received by the broadcast antenna 26 is amplified by a reception amplifier 210, demodulated by a TV/radio reception unit 215, and converted into digital signal data by an A/D conversion unit 220. Then, a first bit reduction unit 225 deletes some of the bits as necessary, and the result is input into a data combination unit 250.

The mobile communication data as a payload is output from a baseband signal output unit 235 and input into the data combination unit 250 through a second bit reduction unit 245 in order to reduce the bits as necessary.

The data combination unit 250 combines broadcast signal data with the payload of the mobile communication. The combined data is input into a header/data combination unit 255, combined with the header output from a header/control signal output unit 240, and transmitted to the extended radio base station 40b via an E/O conversion unit 260 for performing conversions from an electrical signal to an optical signal and the like.

The A/D conversion unit 220, the first bit reduction unit 225, the second bit reduction unit 245, the data combination unit 250, and the header data combination unit 255 shown in FIG. 10 correspond to the signal superposition unit 28 shown in FIG. 10.

The operations of reducing bits, combining data, and combining a header with data are almost the same as those explained by referring to FIG. 5 in embodiment 1. The difference from the operation shown in FIG. 5 is that the header/data separating operation is not required for the base station transmission data shown by (1) in FIG. 5.

FIG. 12 is an explanatory view of an example of the block diagram showing the functioning of the extended radio base station 40b. The only difference from the extended radio base station 40a of embodiment 1 shown in FIG. 6 is that the interface portion with the communication line is a base station interface 505, while the other function blocks are the same as those of embodiment 1.

Figure 13:
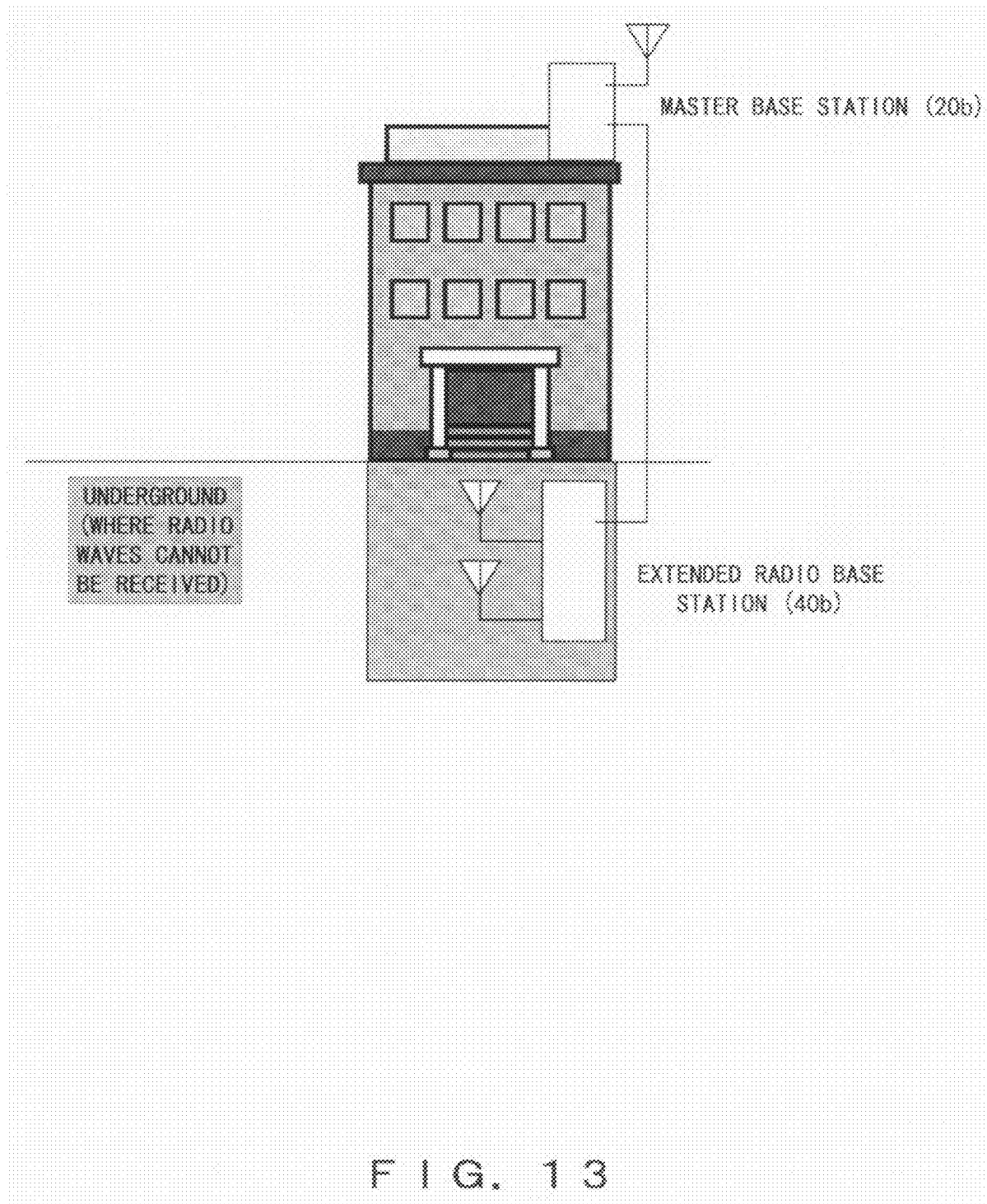
FIG. 13 is an explanatory view showing the mode of mounting an extended radio base station system according to embodiment 2.

FIG. 13 is an explanatory view showing the mode of mounting an extended radio base station system according to embodiment 2. In the example shown in FIG. 13, even though the extended radio base station 20b is provided in an underground location of the building where the master base station 20b is mounted, it is not necessary to limit the location to an underground location in the same building. Furthermore, mounting the body of the extended radio base station 20*b* is not required; what is required is mounting an antenna in an underground point where no radio waves are received.

If an existing master base station is provided in an area where a broadcast wave can be received, the broadcast wave can be retransmitted by reforming the station as the master base station 20*b* according to embodiment 2.

When a master base station is newly provided, a mounting place where a broadcast wave can be received is selected, and the configuration according to embodiment 2 is adopted, thereby retransmitting the broadcast wave without using a combination unit.

Embodiment 3

Next, monitoring a broadcast retransmission system is explained below as embodiment 3. Embodiment 3 can be applied also in the extended radio base station system according to embodiment 1 and the extended radio base station system according to embodiment 2, as is clearly explained below.

Normally, an extended radio base station system performs monitoring control so that abnormal conditions and faults can be detected. According to embodiment 3, the broadcast retransmission system is monitored using this monitoring control system.

As a precondition of embodiment 3, the extended radio base station system according to the present invention has the function of detecting an abnormal condition and measuring the status of the unit having a broadcast wave transmitting/receiving function.

FIG. 14 is a chart to explain the monitoring data mapping according to embodiment 3, being applied in the extended radio base station system according to embodiment 1.

(1) and (2) in FIG. 14 show mobile communication uplink data from the extended radio base station 40*a* to the master base station 20*a* as shown in FIG. 5 and also show the data mapped on the p-row and q-column table.

The extended radio base station 40*a* performs a broadcast wave transmission level measurement and monitors faults in a transmitting function of the TV/radio transmission unit 455, TV/radio transmission amplifier, etc. so that a measurement result and a fault monitor result can be mapped at the first half portion of the header of the uplink data, as shown by (1) in FIG. 14, and can be reported to the master base station. The header includes the control information for mobile communications, but an available area is normally included in this information and used in monitoring the broadcast wave retransmission system.

If there is no appropriate available area, an available area can be obtained by increasing the header area by changing the p-row and q-column mapping, for example by increasing the number of rows and decreasing the number of columns, etc.

The combination unit 30 measures the reception level of a broadcast wave and monitors faults of the broadcast wave receiving function of the TV/radio reception unit 315 and the like so that the measurement result and the fault monitor result can be mapped on the second half of the header of the uplink data and be reported to the master base station.

As described above, in the extended radio base station system according to embodiment 3, the broadcast wave transmission status of an extended radio base station is monitored using the header area of uplink data, and the broadcast wave reception status of the combination unit can be monitored.

The present invention is explained in detail as described above, and can obtain the following effects.

(1) In a radio wave cutoff space such as an underground area or the like, mobile telephone communication and broadcast receiving operations can be realized.

(2) By incorporating the mobile telephone system and the broadcast retransmission system into one system, it is not necessary to provide each respective device. Therefore, the space required for mounting and the load of the construction can be reduced.

(3) The system is especially effective for retransmitting digital broadcasts of mobile telephones, a system being developed presently.

(4) The monitoring of broadcast retransmission function can be realized using the monitoring function of the base station.

(5) A new cable is not required, as coaxial cables, optical cables, etc. for existing base station line can be used.

What is claimed is:

1. An extended radio base station system having a master base station for mobile communications and an extended radio base station that is connected to the master base station via a communication line and has a radio transmitting/receiving function for the mobile communication, comprising:

a broadcast wave reception unit receiving broadcast waves;

a signal superposition unit superposing a broadcast signal obtained from broadcast waves received by the broadcast wave reception unit on a mobile communication signal from the master base station to the extended radio base station, and transmitting the superposed mobile communication signal and broadcast signal to the extended radio base station, wherein the extended radio base station separates the broadcast signal from the superposed and transmitted signal, and retransmits the resultant signal as a broadcast wave.

2. The system according to claim 1, further comprising a combination unit having the broadcast wave reception unit and the signal superposition unit, wherein the master base station and the combination unit are connected via a first communication line, and the combination unit and the extended radio base station are connected via a second communication line; and the combination unit uses the signal superposition unit to superpose the broadcast signal obtained from the broadcast wave received by the broadcast wave reception unit, and transmits the resultant signal to the second communication line.

3. The system according to claim 2, wherein a plurality of extended radio base stations are connected to the combination unit via the second communication line.

4. The system according to claim 2, wherein an amount of transmission signal data of the mobile communication signal or the broadcast signal is decreased depending on the bandwidth of the second communication line.

5. The system according to claim 2, wherein the data of the mobile communication signal on the first communication line is in the format of first plural repetitions of a unit comprising a first fixed length of a header portion and a second fixed length of a payload portion;

the broadcast signal is obtained by A/D conversion of a signal obtained from the broadcast wave received by the broadcast wave reception unit, and the data of the signal is in the format of second plural repetitions of a unit comprising only a payload portion having the same length as the second fixed length;

the signal superposition unit temporarily separates the header portion from the payload portion of each unit of the mobile communication signal on the first communication line, and combines the payload portion with the broadcast signal of the mobile communication signal, thereby superposing the broadcast signal on the mobile communication signal.

6. The system according to claim 5, wherein
an amount of transmission signal data of the mobile communication signal or the broadcast signal is decreased by deleting a part of the unit of the mobile communication signal or the broadcast signal, depending on the bandwidth of the second communication line.

7. The system according to claim 6, wherein
an amount of transmission signal data of the broadcast signal is decreased depending on the status of the traffic of the mobile communication signal.

8. The system according to claim 6, wherein
a broadcast signal of each broadcast channel is assigned to the payload portion on the basis of the position of a word of the payload unit for each unit of the broadcast signal.

9. The system according to claim 1, wherein
the master base station comprises the broadcast wave reception unit and the signal superposition unit.

10. The system according to claim 9, wherein
an amount of transmission signal data of the mobile communication signal or the broadcast signal is decreased depending on the bandwidth of the communication line.

11. The system according to claim 9, wherein
the data of the mobile communication signal on the communication line is in the format of first plural repetitions of a unit comprising a first fixed length of a header portion and a second fixed length of a payload portion;
the broadcast signal is obtained by A/D converting a signal obtained from the broadcast wave received by the broadcast wave reception unit, and the data of the signal is in the format of second plural repetitions of a unit comprising only a payload portion having the same length as the second fixed length;
the signal superposition unit temporarily separates the header portion from the payload portion of each unit of the mobile communication signal on the first communication line, and combines the payload portion with the broadcast signal of the mobile communication signal, thereby superposing the broadcast signal on the mobile communication signal.

12. The system according to claim 1, wherein
broadcast wave transmission status is monitored in the extended radio base station using the header area of uplink data for mobile communications from the extended radio base station to the master base station.

13. The system according to claim 2, wherein
broadcast wave transmission status is monitored in the combination unit using the header area of uplink data for mobile communications from the extended radio base station to the master base station.

14. A combination unit for use in an extended radio base station system having a master base station for mobile communications and an extended radio base station that is connected to the master base station via a communication line and has a radio transmitting/receiving function for mobile communications, comprising:
being connected to the master base station via a first communication line;
being connected to the extended radio base station via a second communication line;
a broadcast wave reception unit receiving a broadcast wave; and
a signal superposition unit superposing a broadcast signal obtained from the broadcast wave received by the broadcast wave reception unit on a mobile communication signal received from the first communication line, and transmitting the resultant signal to the second communication line.

15. A method, for use in an extended radio base station system having a master base station for mobile communications and an extended radio base station that is connected to the master base station via a communication line and that has a radio transmitting/receiving function for the mobile communications, for superposing a broadcast signal on a mobile communication signal by a combination unit connected to the master base station via a first communication line and to the extended radio base station via a second communication line, comprising:
separating a mobile communication signal received from the first communication line into a header and a payload;
generating a broadcast signal digitized by A/D converting an obtained signal after receiving the broadcast wave;
combining the payload with the broadcast signal; and
combining the combined signal with the separated header and transmitting the result to the second communication line.

* * * * *